United States Patent [19]
Kasa et al.

[11] Patent Number: 5,687,263
[45] Date of Patent: Nov. 11, 1997

[54] OPTICAL RF BANDPASS FILTER AND METHOD FOR MANUFACTURING SAME

[75] Inventors: Shannon D. Kasa; Randy L. Shimabukuro, both of San Diego; Wadad B. Dubbelday, Spring Valley; Debra M. Gookin, San Diego, all of Calif.

[73] Assignee: The United States of America as represented by the Secretary of the Navy, Washington, D.C.

[21] Appl. No.: 537,373

[22] Filed: Oct. 2, 1995

[51] Int. Cl.$^6$ .................... G02B 6/26; G02B 5/08
[52] U.S. Cl. .................... 385/31; 385/14; 385/15; 385/38; 385/49; 385/51; 385/123; 385/131; 359/883; 359/885; 359/890; 359/900
[58] Field of Search .................... 385/12, 14, 15, 385/27, 30, 31, 38, 47, 49, 51, 123, 130, 131; 359/850, 883, 885, 890, 900

[56] References Cited

U.S. PATENT DOCUMENTS

| | | | |
|---|---|---|---|
| H1059 | 5/1992 | Konig . | |
| 4,553,101 | 11/1985 | Mathis | 329/50 |
| 4,577,924 | 3/1986 | Mathis | 385/15 X |
| 4,725,114 | 2/1988 | Murphy | 385/49 X |
| 4,726,644 | 2/1988 | Mathis | 385/24 X |
| 4,818,058 | 4/1989 | Bonanni | 385/53 X |
| 4,830,451 | 5/1989 | Stone | 356/352 X |
| 4,836,638 | 6/1989 | Finzel | 385/49 X |
| 4,900,116 | 2/1990 | Mathis | 385/123 X |
| 5,002,352 | 3/1991 | Bradley et al. | 385/129 X |
| 5,054,875 | 10/1991 | Curran | 385/27 |
| 5,208,886 | 5/1993 | Clayton et al. | 385/73 |
| 5,237,630 | 8/1993 | Hogg et al. | 385/12 |

*Primary Examiner*—Brian Healy
*Attorney, Agent, or Firm*—Harvey Fendelman; Peter A. Lipovsky; Michael A. Kagan

[57] ABSTRACT

A method for manufacturing an optical RF bandpass filter comprises the steps of: (1) mounting an optical fiber having first and second ends in a fiber support structure having first and second surfaces so that the first end is exposed at the first surface and the second end is exposed at the second surface; (2) forming a first layered mirror structure on a first substrate to create a first mirror wafer structure having a first reflective surface; (3) forming a second layered mirror structure on a second substrate to create a second mirror wafer structure having a second reflective surface; (4) affixing the first reflective surface of the first mirror wafer structure to the first surface of the fiber support structure; and (5) affixing the second reflective surface of the second mirror wafer structure to the second surface of the fiber support structure.

29 Claims, 5 Drawing Sheets

OPTICAL RF BANDPASS FILTER AND METHOD FOR MANUFACTURING SAME

BACKGROUND OF THE INVENTION

The present invention relates to the field of bandpass filters, and more particularly, to optical RF bandpass filters employing an optical resonant cavity.

Optical bandpass filters, such as those taught in U.S. Pat. Nos. 5,002,352 and 4,577,924, are well known devices. They generally include an optical resonant cavity comprising an optical fiber having a specific length and mirrors formed at each end of the optical fiber. Apertures in each mirror allow an RF modulated light signal, which may have multiple modulation RF frequency characteristics, to be injected into and resonate at the RF modulation frequency within the fiber. The output signal generally has a center wavelength related to the length of the optical fiber in accordance with the relation: $L=c/2nf_{RF}$, where "L" is the length of the optical fiber, "c" is the speed of light in a vacuum, "n" is the index of refraction of the optical fiber at the wavelength of light, and $f_{RF}$ is the modulation radio frequency at the center of the RF bandpass. The modulation radio frequency is to be distinguished from the carrier frequency of the RF modulated optical signal.

In the conventional manufacture of optical RF bandpass filters, the mirrors are fabricated directly on the ends of the optical fiber. Apertures may then be formed in the mirrors. However, forming highly reflective mirrors directly on the ends of the fibers and then forming apertures in the mirrors is difficult. The apertures tend to have sloped sidewalls, causing high insertion losses. An optical RF bandpass filter having a mirror structure with a more precisely defined aperture would exhibit improved optical coupling efficiency with fewer insertion losses compared to mirror structures fabricated by conventional techniques. Therefore, a need exists for a better technique for economically manufacturing an optical bandpass filter having mirrors with high reflectivity and more precisely defined apertures.

SUMMARY OF THE INVENTION

An optical RF bandpass filter comprises: an optical fiber support structure having a channel; an optical fiber having first and second ends mounted in the channel; a first mirror structure having a first reflective surface and which comprises alternate layers of a first material having a first refractive index, $R_1$, and a second material having a second refractive index, $R_2$, where $R_1 \neq R_2$, and the first mirror structure is affixed to the optical fiber support structure so that the first reflective surface abuts the first end of the optical fiber; and a second mirror structure having a second reflective surface and which comprises alternate layers of a third material having a third refractive index, $R_3$, and a fourth material having a fourth refractive index, $R_4$, where $R_3 \neq R_4$, and the second mirror structure is affixed to the optical fiber support structure so that the second reflective surface abuts the second end of the optical fiber.

The present invention also provides a process for manufacturing the optical RF bandpass filter described above. Such comprises the steps of: (1) mounting an optical fiber having first and second ends in a fiber support structure having first and second surfaces so that the first end is exposed at the first surface and the second end is exposed at the second surface; (2) forming a first layered mirror structure on a first substrate to create a first mirror wafer structure having a first reflective surface; (3) forming a second layered mirror structure on a second substrate to create a second mirror wafer structure having a second reflective surface; (4) affixing the first reflective surface of the first mirror wafer structure to the first surface of the fiber support structure; and (5) affixing the second reflective surface of the second mirror wafer structure to the second surface of the fiber support structure.

An important advantage of the invention is that it provides an optical RF bandpass filter that is easy to manufacture. Furthermore, the mirrors of the filter may be manufactured as separate structures using standard photolithographic techniques, thereby providing mirrors having excellent reflectivity and accurately positioned apertures. Such apertures have very straight sidewalls which provide the optical bandpass filter with excellent optical coupling efficiency. These and other advantages of the invention will become more readily apparent upon review of the accompanying specification and figures.

DESCRIPTION OF THE DRAWINGS

Throughout the several figures, like elements are referenced using like references.

DESCRIPTION OF THE PREFERRED EMBODIMENT

The present invention provides a novel optical RF bandpass filter suitable for detecting RF signals in very wide bandwidth (18+ GHz) environments. The filter includes a resonant optical cavity comprising an optical fiber mounted within a fiber support structure and layered optical mirror structures mounted to each end of the support structure. The reflectivity of the mirror structures, the size of any apertures, if present, and the length of the optical fibers determine the performance characteristics of the filter.

Also described is a method for manufacturing optical RF bandpass filters. An important improvement provided by the method of the present invention is that the layered mirror structures are fabricated prior to being attached to the optical fiber ends. The mirror structures comprise an alternating series of thin films which are deposited and patterned on flat substrates using standard photolithographic techniques well known in the semiconducting industry. The use of standard semiconducting manufacturing techniques allows the mirror structures to be more easily manufactured in a mass production environment. Furthermore, such mirror structures may be etched anistropically to produce apertures having essentially vertical sidewalls, resulting in a filter exhibiting lower insertion losses of the standard filters. Insertion loss refers to light lost because it does not get into the cavity.

Figure 1:
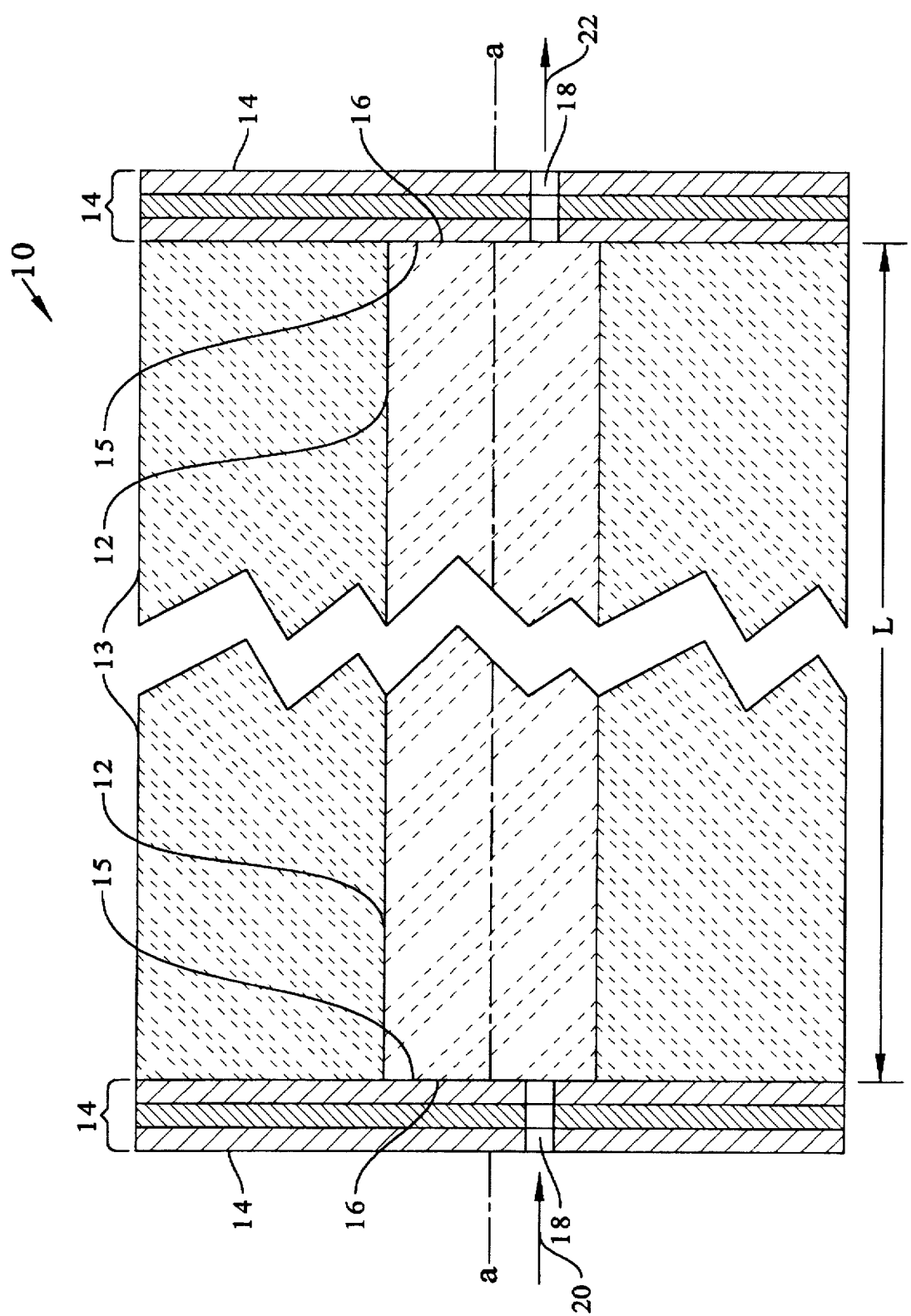
FIG. 1 is a cross-sectional view of an optical RF bandpass filter embodying various features of the present invention.

Referring to FIG. 1, there is shown a cross-sectional view of an optical RF bandpass filter 10 embodying various features of the present invention. The optical RF bandpass filter 10 includes an optical fiber 12, having a longitudinal center axis a—a, fixedly mounted within an optical fiber support structure 13. Layered mirror structures 14 are affixed to each end 16 of the support structure 13 and, therefore, abut the ends 15 of the optical fiber 12. The centers of the optional apertures 18, which may be formed in the mirror structures 14 as shown, are preferably offset from the optical center axis a—a of the optical fiber 12. Such offset is important in order to excite the several modes of the optical fiber 12 in order to promote mode mixing of the optical signal 20 and reduce coherence effects from the light source, not shown.

In the operation of the optical RF bandpass filter 10, an optical input signal 20, on which a generally multi-radio frequency signal may be superimposed, enters aperture 18, if present, or otherwise directly through mirror structure wafer 41 and resonates in the optical fiber 12 between opposed reflective surfaces 15 of the mirror structures 14. After resonating in the optical fiber 12, the input signal 20 exits the optical fiber (through aperture 18, otherwise through the transparent substrate 40) as a filtered optical signal 22 having a well defined center wavelength.

Figure 2:
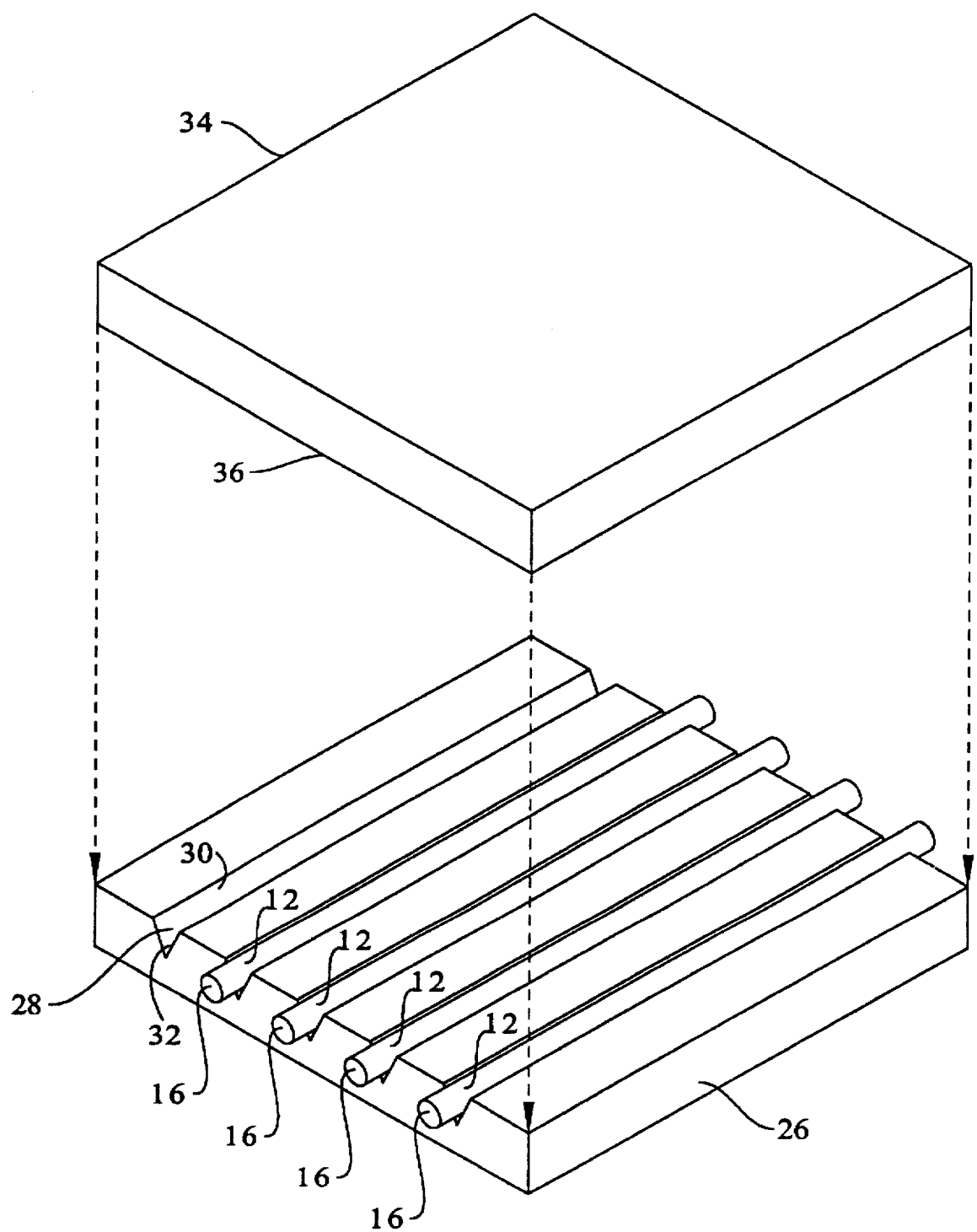
FIG. 2 shows the assembly of the optical fibers between the upper and lower quartz plates comprising the optical fiber support structure.
Figure 3:
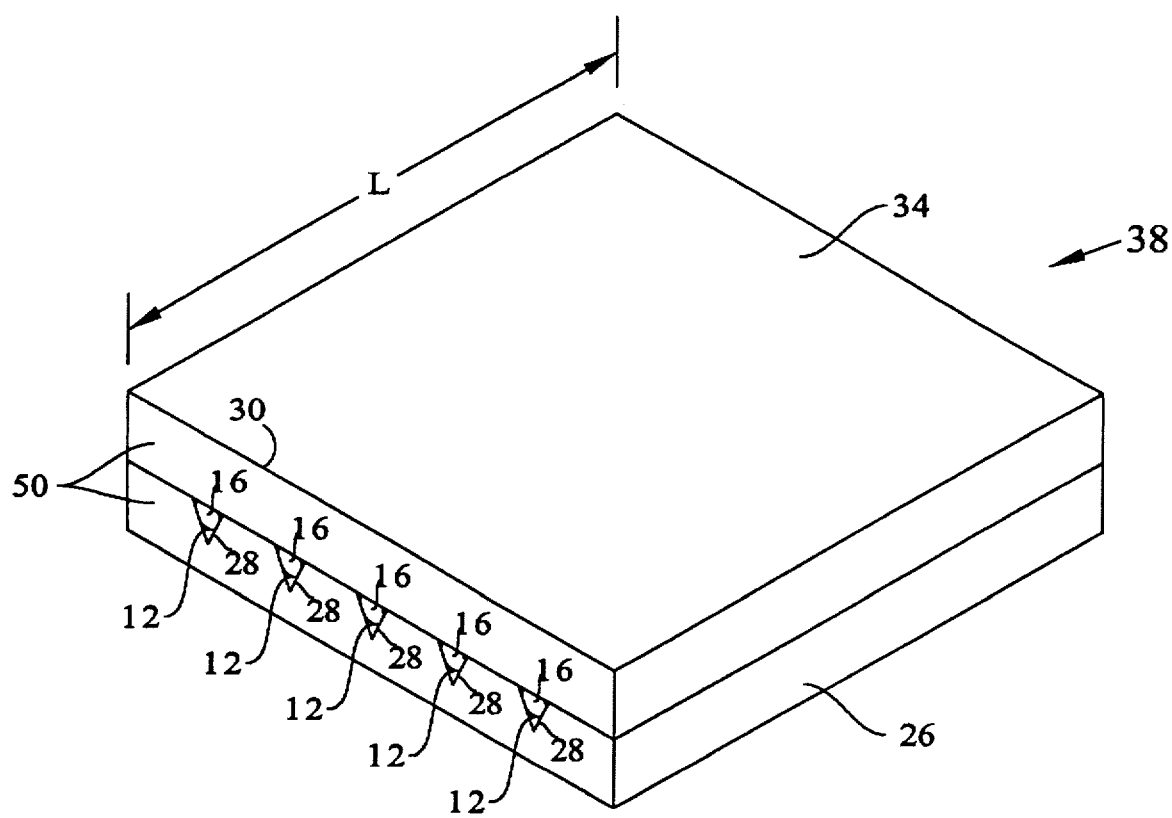
FIG. 3 is a perspective view of the assembled optical fiber support structure.

Referring to FIG. 2, the manufacture of the optical RF bandpass filter 10 employs a fiber optic support structure 13 comprised of a bottom plate 26 in which one or more grooves 28 having sides 30 and 32 are formed, and a top plate 34 having a planar surface 36. By way of example, the grooves 28 may be V-shaped as shown, or U-shaped. The top and bottom plates 26 and 34 support the optical fibers 12, and are preferably made of quartz or another other material having a thermal expansion coefficient and hardness characteristics similar to those of the optical fibers 12 so that they may be polished uniformly. The planar surface 36 and the grooves 28 should be thoroughly cleaned, as for example, using acetone, ethanol, or by ultrasonic techniques. Optical fibers 12 then are placed in each groove 28. The top plate 34 then preferably is affixed to the bottom plate 26 using an ultraviolet light (UV) curable epoxy adhesive, such as Norland Optical Adhesive No. 61, or an epoxy adhesive so that the optical fibers 10 are fixedly mounted within the spaces defined by the grooves 28 the planar surface 36 of top quartz plate 34. The epoxy adhesive should have stability after being cured and chemical resistance to the types of acids and other chemicals used in photolithographic processes later used to manufacture the filter structures 14. Clamps or other suitable means (not shown) may be employed to hold the top and bottom plates 26 and 34 firmly together until the epoxy is completely cured. By way of example, the assembled plates 22 and 24 may be exposed to an ultraviolet (UV) lamp, or heat lamp, depending on the type of epoxy resin employed. Such exposure should be for a period sufficient to thoroughly cure the epoxy adhesive, thereby forming an optical fiber support structure 13 as shown in FIG. 3. The optical fiber support structure 13 is illustrated as supporting six optical fibers 12. However, it is to be understood that the optical fiber support structure 13 may be configured to have any suitable number of grooves 28.

Still referring to FIG. 3, the optical fiber support structure 13 then is trimmed so that the overall length of the optical fibers 12 mounted in the support structure 13 are slightly longer than the desired cavity length, L, of the optical RF bandpass filter 10. The cavity length is dependent upon the desired center wavelength performance characteristics of the optical RF bandpass filter 10 in accordance with the relation: $L=c/2nf_{RF}$, where "c" is the speed of light, "n" is the overall refractive index of the optical RF bandpass filter, and $f_{RF}$ is the center bandpass frequency of the RF signal output by optical RF bandpass filter 10. The optical fiber support structure 13, and hence the optical fibers 12, preferably are ground and polished to have a mirror-smooth finish having a cavity length "L".

Figure 4:
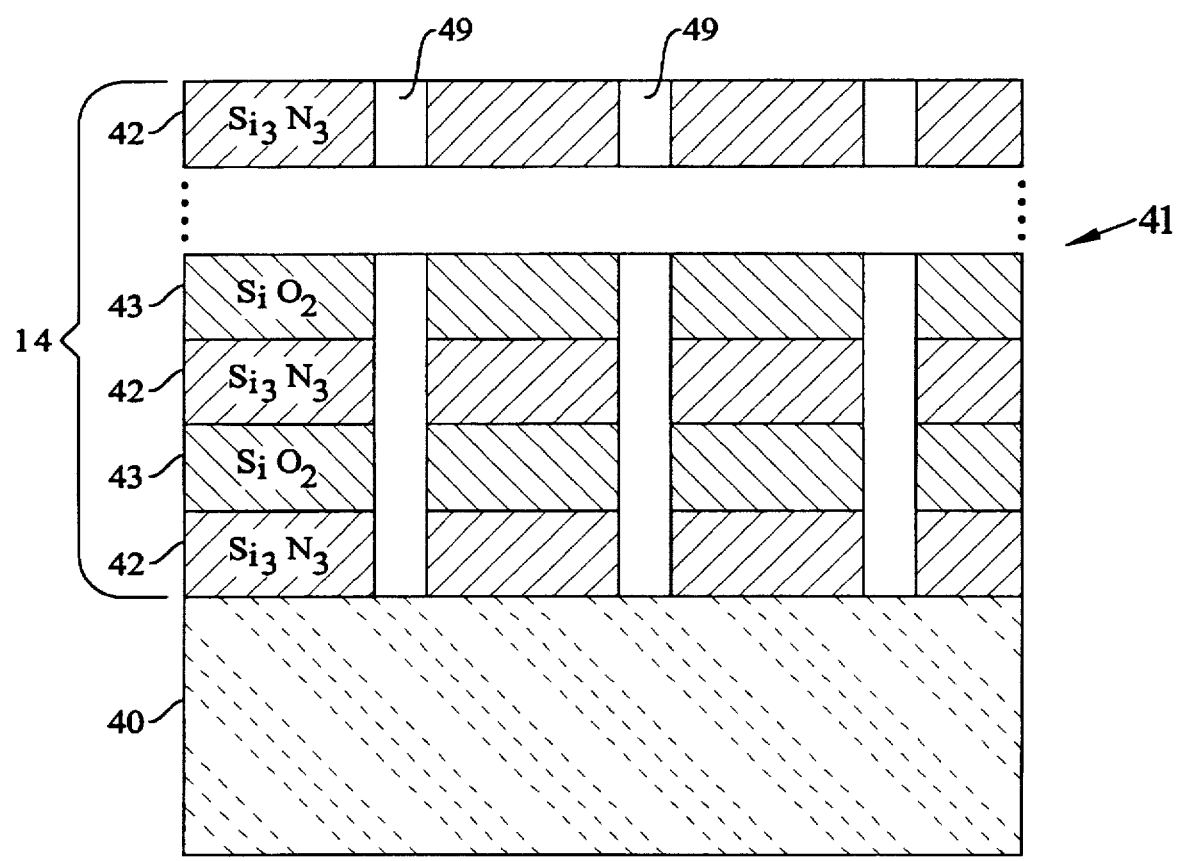
FIG. 4 shows a cross-section of a mirrored wafer comprising a layered mirror structure formed on a substrate.

The layered mirror structures 14 should have very high reflectivity to provide the filters 10 with high Q performance, where high Q performance refers to a filter having a narrow bandpass response. Manufacture of one suitable type of layered mirror structure is described with reference to FIG. 4. The mirror structure 14 is preferably fabricated to have a series of alternating films, or layers 42 and 43 formed on a quartz or silicon substrate 40, where the refractive indices of the layers 42 and 43 are not equal. The layered mirror structure 14 formed on substrate 40 is referenced as "mirrored silicon wafer 41." Each of the layers 42 and 43 may have an optical thickness of about $\theta/(4n)$, where $\theta$ represents the wavelength of the optical signal 20, and "n" represents the index of refraction of the material comprising the layer. By way of example, layers 42 may consist of silicon nitride ($Si_3N_4$) and have a relatively high refractive index $n_{42}$ ($n_{42}$=2.0), and layers 43 may consist of silicon dioxide ($SiO_2$) and have a relatively low refractive index, $n_{43}$ ($n_{43}$=1.55). Such materials may be deposited using standard semiconducting processing techniques to obtain a mirror structure having excellent reflectivity, "R", where for example, R>0.999. In some applications, the layers 42 may be made of titanium dioxide. In FIG. 4, the layers 42 and 43 are shown, by way of example only, as having a particular order starting from the surface of substrate 40. However, it is to be understood that within the scope of the invention, $n_{42} \neq n_{43}$, and the alternating layers 42 and 43 may be formed in any suitable order.

The number of alternating layers 42 and 43 determine the reflectivity of the mirror structure 14. By way of example in one implementation where the optical RF bandpass filter was constructed to pass, or "filter," an RF signal having a wavelength of 1.3 microns, the mirror structure 14 was comprised of a combined total of thirty-one layers 42 of silicon nitride ($Si_3N_4$) and layers 43 of silicon dioxide ($SiO_2$) having a total thickness of 5.789 microns. In such example, the mirror structure 14 had a reflectivity, "R", of at least 0.999. In this implementation, the thickness of each $Si_3N_4$ layer 42 and each $SiO_2$ layer 43 was about 0.34 microns. The layers 42 and 43 may be deposited on a quartz substrate 40 using ion beam sputtering techniques to form mirrored silicon wafer 41. The substrate 40 is preferably made of quartz because quartz has a refractive index (n=1.55) that matches the refractive index of silicon dioxide, and because quartz can be ground and polished using the same techniques used to grind and polish the ends 16 of the optical fibers 12. Although quartz has been identified as a preferred material, the substrate 40 may also be fabricated from silicon.

After forming the layers 42 and 43 on the substrate 40, standard photolithographic techniques are employed to etch one or more apertures 18 (three apertures are shown for illustrative purposes only) through in the layers 42 and 43 of mirrored silicon wafer 41 to expose the substrate 40 at appropriate locations using standard photolithographic processes. The apertures 18 are patterned so that they may subsequently be suitably positioned relative to the longitudinal axes of optic fibers 12 mounted in the optical fiber support structure 13. The mirror structures 14 may be bonded to the fiber optic support structure 13 using a thin coat of index matching optical epoxy adhesive such as Norland Optical Adhesive No. 61 applied to the ends 50 of the optical fiber support structure 30. The substrates 40 may then be ground off or otherwise removed from the mirror structures 14. However, there may be some applications where it may be desirable to leave the mirror structure wafers 41 intact.

Figure 5:
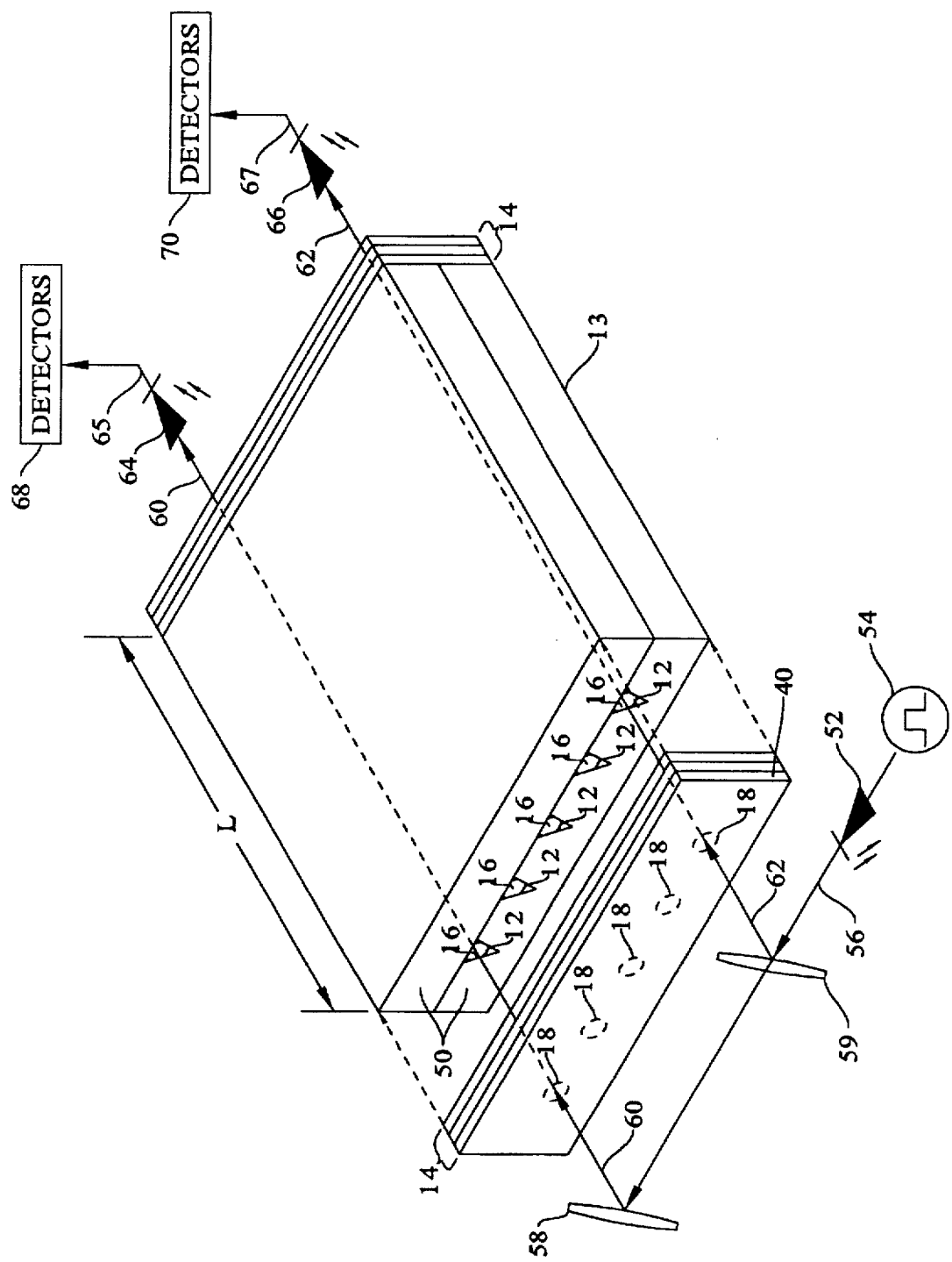
FIG. 5 illustrates the step of affixing the mirrored wafer to the optical fiber support structure.

Referring to FIG. 5, the mirrored silicon wafer 41 next is placed in close proximity to the optical fiber support structure 13 so that the reflective surface 15 of mirror structure 14 faces the end surface 50 of the optical fiber support structure 13. However, the mirrored silicon wafer 41 is not allowed to contact the end surface 50 until it is suitably aligned with the ends 16 of the optical fibers 12 exposed at the end surface 50. Proper alignment is facilitated by pulse generator 52 which drives laser diode 54 to generate an optical signal 56.

By way of example, the optical signal 56 may preferably be divided into two or more optical signals 60 and 62 by beam splitters 58 and 59, respectively. However, it is to be understood that the optical signal 56 may be divided into any number of optical signals to suit the requirements of a particular application. For example, in some applications it may be desirable to split the beam 56 into as many beams as there are optical fibers 12 in the support structure 13. The beams splitters 58 and 59 direct the optical signals 60 and 62 through the transparent substrate 40 and corresponding apertures 18 (shown in phantom) formed in the layer mirror structure 14 which preferably are further apart. After propagating through the mirrored structure wafer 41, optical signals 60 and 62 propagate through the corresponding optical fibers 12 to the photodiodes 64 and 66, respectively. The outputs of the photodiodes 64 and 66 are electrical signals 65 and 67 which are received by detectors 68 and 70. When the both detectors 68 and 70 indicate that the outputs of the photodiodes 64 and 66 are at relative maxima, the mirror wafer structure 41 is optically aligned with the optical fiber support structure 13. Then using an X-Y stage (not shown), the mirrored silicon wafer 41 is carefully positioned so that the mirror structure 14 is gently placed in contact with the optical fiber support structure 13. The mirrored silicon structure 41 and the optical fiber support structure 13 then are exposed to UV light, thereby curing the epoxy adhesive to affix the mirror structure wafer 41 to the optical fiber support structure 13. Optionally, the substrate 40 may be ground off or otherwise removed from the mirror structure wafer 41.

Obviously, many modifications and variations of the present invention are possible in light of the above teachings. It is therefore to be understood that within the scope of the appended claims, the invention may be practiced otherwise than as specifically described.

We claim:

1. A method for manufacturing an optical RF bandpass filter, comprising the steps of:
    mounting an optical fiber having first and second ends in a fiber support structure having first and second surfaces so that said first end is exposed at said first surface and said second end is exposed at said second surface;
    forming a first layered mirror structure on a first substrate to create a first mirror wafer structure having a first reflective surface;
    forming a second layered mirror structure on a second substrate to create a second mirror wafer structure having a second reflective surface;
    affixing said first reflective surface of said first mirror wafer structure to said first surface of said fiber support structure; and
    affixing said second reflective surface of said second mirror wafer structure to said second surface of said fiber support structure.

2. The method of claim 1 further including the step of removing said first substrate from said first mirror wafer structure.

3. The method of claim 1 further including the step of removing said second substrate from said second mirror wafer structure.

4. The method of claim 1 further including the step of forming at least one aperture in said first layered mirror structure.

5. The method of claim 1 further including the step of forming at least one aperture in said second layered mirror structure.

6. The method of claim 1 wherein said first and second substrates consist essentially of quartz.

7. The method of claim 1 wherein said first and second substrates consist essentially of silicon.

8. The method of claim 1 wherein said first layered mirror structure is manufactured by forming alternate layers of first and second materials on said first substrate, said first material having a first refractive index, $R_1$, and said second material having a second refractive index, $R_2$, where $R_1 \neq R_2$.

9. The method of claim 8 wherein said first layer includes silicon nitride.

10. The method of claim 8 wherein said first layer includes titanium dioxide.

11. The method of claim 8 wherein said second layer includes silicon dioxide.

12. The method of claim 8 wherein said first and second layers are formed by ion beam sputtering.

13. The method of claim 1 wherein said second layered mirror structure is manufactured by forming alternate layers of third and fourth materials on said second substrate, said third material having a third refractive index, $R_3$, and said fourth material having a fourth refractive index, $R_4$, where $R_3 \neq R_4$.

14. The method of claim 13 wherein said third layer includes silicon nitride.

15. The method of claim 13 wherein said third layer includes titanium dioxide.

16. The method of claim 13 wherein said fourth layer includes silicon dioxide.

17. The method of claim 13 wherein said third and fourth layers are formed by ion beam sputtering.

18. An optical RF bandpass filter, comprising:
    an optical fiber support structure having a channel;
    an optical fiber having first and second ends mounted in said channel; and
    a first mirror structure having a first reflective surface and which comprises alternate layers of a first material having a first refractive index, $R_1$, and a second material having a second refractive index, $R_2$, where $R_1 \neq R_2$, and said first mirror structure is affixed to said optical fiber support structure so that said first reflective surface abuts said first end of said optical fiber; and
    a second mirror structure having a second reflective surface and which comprises alternate layers of a third material having a third refractive index, $R_3$, and a fourth material having a fourth refractive index, $R_4$, where $R_3 \neq R_4$ and said second mirror structure is affixed to said optical fiber support structure so that said second reflective surface abuts said second end of said optical fiber.

19. The optical RF bandpass filter of claim 18 wherein said first material includes silicon nitride.

20. The optical RF bandpass filter of claim 18 wherein said first material includes titanium dioxide.

21. The optical RF bandpass filter of claim 18 wherein said second material includes silicon dioxide.

22. The optical RF bandpass filter of claim 18 wherein said first mirror structure is formed using ion sputtering techniques.

23. The optical RF bandpass filter of claim 18 wherein said optical fiber has a predetermined length.

24. The optical RF bandpass filter of claim 18 wherein said first mirror structure includes at least one aperture.

25. The optical RF bandpass filter of claim 18 wherein said third material includes silicon nitride.

26. The optical RF bandpass filter of claim 18 wherein said third material includes titanium dioxide.

27. The optical RF bandpass filter of claim 18 wherein said fourth material includes silicon dioxide.

28. The optical RF bandpass filter of claim 18 wherein said second mirror structure is formed using ion sputtering techniques.

29. The optical RF bandpass filter of claim 18 wherein said second mirror structure includes at least one aperture.

* * * * *